United States Patent [19]
Vogeley et al.

[11] Patent Number: 5,257,103
[45] Date of Patent: Oct. 26, 1993

[54] METHOD AND APPARATUS FOR DEINTERLACING VIDEO INPUTS

[75] Inventors: James H. Vogeley, Yorktown; Garth S. Jones, Virginia Beach; Kenneth Kosin, Hampton; Stephen S. Trani, Virginia Beach, all of Va.

[73] Assignee: nView Corporation, Newport News, Va.

[21] Appl. No.: 830,409

[22] Filed: Feb. 5, 1992

[51] Int. Cl.⁵ .............................................. H04N 7/01
[52] U.S. Cl. ...................................... 358/140; 358/11
[58] Field of Search .................. 358/140, 11, 12, 141, 358/230, 241

[56] References Cited

U.S. PATENT DOCUMENTS

| | | | |
|---|---|---|---|
| 4,511,926 | 4/1985 | Crossland et al. | 358/236 |
| 4,591,848 | 5/1986 | Morozumi et al. | 340/784 |
| 4,694,349 | 9/1987 | Takeda et al. | 358/241 |
| 4,746,981 | 5/1988 | Nadan et al. | 358/160 |
| 4,750,813 | 6/1988 | Ohwada et al. | 350/333 |
| 4,763,993 | 8/1988 | Vogeley et al. | 350/331 T |
| 4,769,713 | 9/1988 | Yasui | 358/236 |
| 4,779,956 | 10/1988 | Nemoto et al. | 350/332 |
| 4,816,819 | 3/1989 | Enari et al. | 340/811 |
| 4,851,827 | 7/1989 | Nicholas | 340/811 |
| 4,864,182 | 9/1989 | Fujioka et al. | 315/169.3 |
| 4,870,396 | 9/1989 | Shields | 340/719 |
| 4,870,399 | 9/1989 | Carlson | 340/811 |
| 4,890,097 | 12/1989 | Yamashita et al. | 340/719 |
| 4,899,141 | 2/1990 | Morozumi et al. | 340/784 |
| 4,901,066 | 2/1990 | Kobayashi et al. | 340/805 |
| 4,922,118 | 5/1990 | Maeshima | 358/140 |
| 4,922,240 | 5/1990 | Duwaer | 340/784 |
| 4,931,787 | 6/1990 | Shannon | 340/784 |
| 4,938,565 | 7/1990 | Ichikawa | 350/332 |
| 4,956,708 | 9/1990 | Itagaki | 358/140 |
| 4,963,860 | 10/1990 | Stewart | 340/719 |
| 4,965,565 | 10/1990 | Noguchi | 340/784 |
| 4,976,536 | 11/1990 | Vogeley et al. | 353/77 |
| 4,982,275 | 1/1991 | Brody | 358/59 |
| 4,985,776 | 1/1991 | Taniji | 358/213.23 |
| 5,134,479 | 7/1992 | Ohishi | 358/11 X |

Primary Examiner—Victor R. Kostak
Attorney, Agent, or Firm—Nixon & Vanderhye

[57] ABSTRACT

Disclosed is a method and apparatus for converting interlaced input video to a sequential output compatible with sequential input display devices. The video input is digitized and decoded so as to provide separate luminance or chrominance information for each pixel to a line buffer memory. A line derived frequency reference from the input video serves to reference a pixel clock which clocks pixel information into the memory and clocks pixel information out of the memory at twice the pixel clock rate. The decoder also digitizes the luminance/chrominance information prior to storage in the memory and, as this information is read out of the memory, it is converted back into analog data by a suitable D-A converter and then is converted into appropriate format to provide red, green and blue video output information for operating sequential input devices.

29 Claims, 5 Drawing Sheets $T_1$ $T_2$

AVERAGED $T_1$ $T_2$

AVERAGED $T_1$ $T_2$

AVERAGED $T_1$ $T_2$

AVERAGED $T_1$ $T_2$

AVERAGED

METHOD AND APPARATUS FOR DEINTERLACING VIDEO INPUTS

BACKGROUND OF THE INVENTION

1. Field of the Invention

The present invention relates to a method and apparatus for converting interlaced raster scan video inputs to a non-interlaced sequential output for driving cathode ray tubes, a three gun projector, liquid crystal displays or any other sequential input display device.

2. Discussion of Prior Art

Conventional television signals are generally conveyed in either NTSC, PAL, or SECAM formats. Each of these formats utilizes a raster scan in which the electron beam "paints" a picture by causing a number of lines of pixel elements to phosphoresce when stimulated by the electron beam in the cathode ray tube. For discussion of various problems in prior art devices NTSC black and white television video will used with its 30 Hz and 60 Hz frame and field rates, respectively.

During scanning, in order to reduce signal bandwith required to transmit or store television images, each of the above videos utilizes "interlacing". Interlacing is a term applied to image scanning in which, during one field or sequence of lines painted by the electron beam, the even numbered lines would be painted and subsequently, in the next field, the odd numbered lines would be painted. The fields are generally provided at a 60 Hz field rate (so as to provide a 30 Hz frame rate with each frame comprising two fields) and the "persistence" of the individual phosphors is such that, when stimulated to emit light, the human eye can see no difference between the fields and "perceives" the picture to be flicker free even at the provided 30 Hz frame rate.

FIGS. 1A–1C illustrate a typical video raster scan input and its operation. FIGS. 1A–1C numbers the lines being painted as well as the pixel number being painted along the vertical and horizontal axes, respectively. In FIG. 1A which is identified as T1 indicating the first field, the odd numbered lines are scanned and for this particular input image (a diagonal line from the upper left to the lower right), pixels 1 and 3 are energized in lines 1 and 3 respectively. In the second frame shown in the second field as shown in FIG. 1B as T2, the even numbered lines are scanned with a result that pixels 2 and 4 are energized in lines 2 and 4. The result due to the persistence of the phosphors on a television screen is the "averaged" image shown in FIG. 1C which results in the desired diagonal line image.

Computers which provide serial non-interlaced outputs, are used to drive various display devices such as three gun projectors, liquid crystal display devices as well as cathode ray tubes at picture rates of 50–80 Hz. Increasingly it has been desirable to be able to combine television video inputs with computer generated video inputs to drive such non-interlaced devices or sequential input devices, which, in Europe, are called progressive scan devices and include matrix devices (such as LCD display panels) which have been manufactured for sequential address operation. Quite obviously, if every other line is not supplied, the picture quality will be seriously degraded.

Several attempts have been made in the past to directly drive non-interlaced devices with conventional video inputs, most often by deleting one of the two fields utilized in making up the frame to be displayed. This is illustrated in FIGS. 2A–2C which shows that the second field, shown in FIG. 2B as T2, contains no data and thus only the scanning of the odd numbered lines (1, 3, 5, etc.) comprises the video data displayed. As a result, the diagonal line which is displayed as shown in FIG. 2C will be relatively weak or diluted because it is missing the even numbered lines and pixel information.

FIGS. 1A through FIG. 8 in this application illustrate single pixels in a "black and white" representation have been shown. Differences in cross hatching represent pixels energized in one or the other of the two fields illustrated and, where there are two lines of cross hatching in single pixel, that indicates that the pixel has been illuminated or energized in both fields of the frame illustrated. Quite clearly, energization in a black and white representation could be either black or white or any one of a number of shades of gray in between. However, it should also be understood that although black and white has been chosen for simplicity of understanding of applicant's invention, the same problems and same advantages appear with respect to color although due to the requirement of providing red, green and blue output energization levels, the pixel represented by a dot of color would actually be three sub-pixels, each representing one of the primary colors.

Another attempted solution to the problem of converting interlaced raster scan video to a sequential video for driving non-interlaced devices is to utilize a dual port frame buffer memory system. A characteristic of such a dual port system is that it can enter and store data in the system at the same time data is being read out of the system, hence the name "dual port" memory. However, the storage requirements of such a memory are rather substantial. Many output devices have a field 640 pixels wide × 480 lines high, which, if color is provided, each pixel is comprised of three subpixels. Both fields T1 and T2 would be read into such a memory so that it contains both the odd numbered lines and the even numbered lines at the same time. Then, the data is sequentially read out for line 1, line 2, line 3, line 4, etc. The memory requirements of the above is quite extensive and expensive.

Video, when displayed by a high resolution display device, has particular problems in displaying video motion. It is known that a 30 Hz frame rate is about at the limit of perceived flicker for the human eye. Where the leading edge of an image in motion across the screen moves, the pixels at the leading edge change at a 30 Hz rate for those devices which store both even and odd interlaced fields in a frame store memory. This 30 Hz change or flicker at the leading edge of a moving image can be very annoying to the viewer especially in a high resolution output device because it occurs at a 30 Hz rate. This phenomenon has been called "dynamic jaggies" by those in the field and is a significant problem in displaying video on n high resolution displays.

In view of the above, there is a need for an inexpensive effective manner of converting raster scan interlaced video to a non-interlaced format for driving video display devices while at the same time reducing perceived flicker and maintaining image resolution.

SUMMARY OF THE INVENTION

In accordance with the above, it is an object of the present invention to provide a method and apparatus for converting interlaced raster scan video inputs into a raster scan non-interlaced video output suitable for driving cathode ray tubes, three gun projectors, liquid crystal display devices and other similar sequential input devices.

It is a further object of the present invention to provide a device for converting from interlaced video to non-interlaced video which retains data from both fields of the interlaced video input.

It is a still further object of the present invention to provide an interlaced to non-interlaced converter which is inexpensive and easy to manufacture.

It is an additional object of the present invention to provide an inexpensive, effective manner of converting raster scan interlaced video to a non-interlaced format for driving video display devices While at the same time reducing perceived flicker and maintaining image resolution.

The above other objects are achieved in accordance with the present invention by providing a dual port line buffer which is driven at twice the pixel clock frequency. Essentially, as the odd lines are read into the memory, each line is read out twice so that pixels will be energized in both line 1 and line 2 where a pixel would normally be energized only in line 1. If a pixel in the even numbered lines is energized, the associated odd line pixel will also be energized. As a consequence of reading out two lines for every input line, there will now be appropriate sequential video output available on every line which can drive sequential input devices.

In preferred embodiments of the present invention, video input is decoded so as to provide separate luminance or chrominance information for each pixel to the line buffer memory. A line derived frequency reference from the input video serves to reference a pixel clock which clocks pixel information into the memory and clocks pixel information out of the memory at twice the pixel clock rate. The decoder also digitizes the luminance/chrominance information prior to storage in the memory and thus, as this information is read out of the memory, it is converted back into analog data by a suitable D-A converter and then is converted into appropriate format to provide red, green and blue video output information for operating sequential input devices.

BRIEF DESCRIPTION OF THE DRAWINGS

A more complete understanding of the above invention will be had by reference to the following drawings wherein.

DETAILED DESCRIPTION OF THE PREFERRED EMBODIMENTS

Figure 9:
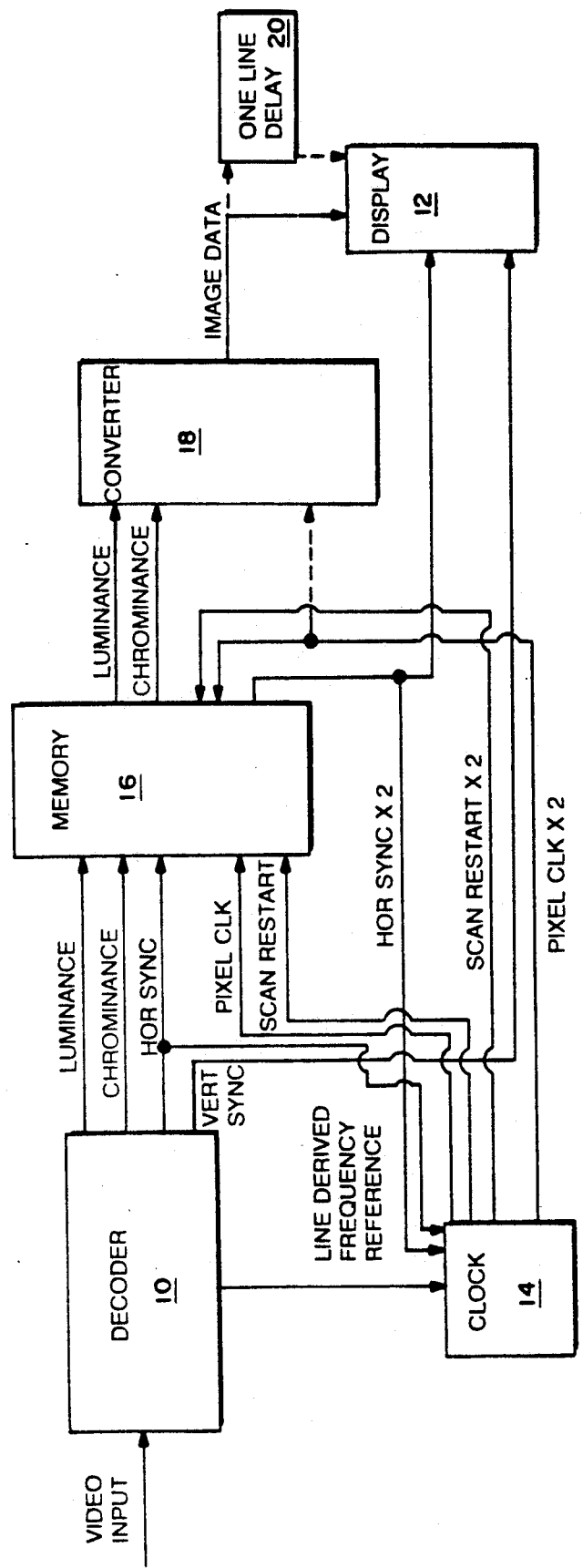
FIG. 9 is a block diagram of one embodiment of the present invention.

FIG. 9 illustrates in block diagram form the operation of a generic embodiment of the present device. Interlaced raster scan video is input to decoder 10 which, in a preferred embodiment, provides a line derived frequency reference output, a digitized luminance and chrominance outputs, horizontal synchronization and vertical synchronization outputs. The vertical synchronization output is directly applied to the vertical synchronization input of the sequential input display device 12. The line derived frequency reference is input to a clock means for providing output pixel clock pulses times 2 (twice the pixel clock rate), and a scan restart times 2 which outputs are supplied to line buffer dual port memory 16. The pixel clock and scan restart inputs to line buffer memory 16 cause the digitized luminance and chrominance to be stored in appropriate addresses in the memory. The line buffer memory is a dual port memory in that it can be stored and read out simultaneously. Memory 16 must be capable of at least storing a complete line of data as supplied from the decoder but could store more than a single line. Advantageously, however, the line buffer memory would not store a complete field or frame for sequential read-out to the sequential input display device 12.

Memory 16 is read out by the pixel clock times 2 input from clock 14 which because it occurs at twice the frequency that data is being input to the line buffer memory causes line 1 information to be read out on line 2 as well. Line 3 information can be read out on line 4, etc. The digitized luminance and chrominance information which is read out is supplied to converter 18 which converts the digital back to analog information and converts the analog chrominance and luminance information into image data output such as red, green, blue energization signals which are applied to display 12. Because duplicate line information is being provided out of memory 16, dual line information is present in the image data supplied to display 12 and the horizontal synchronization signal times 2 is also supplied to display 12 to cause the two line display of each lines of information read into the memory.

Figure 1A:
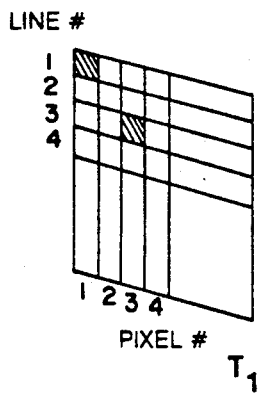
FIGURES 1A-1C illustrate conventional interlaced raster scan video input.
Figure 1B:
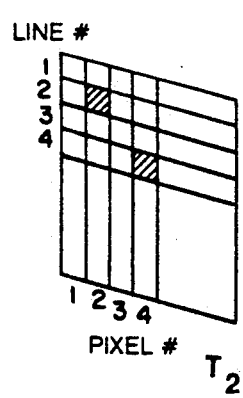
Figure 3A:
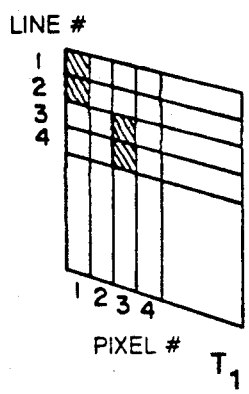
FIGS. 3A-3C illustrate the pixel outputs in accordance with the present invention with the video input shown in FIGS. 1A-1C.
Figure 3B:
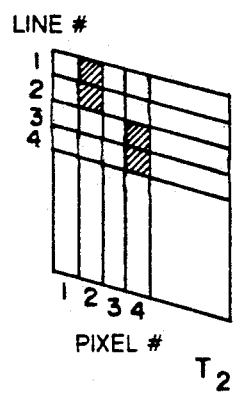
Figure 3C:
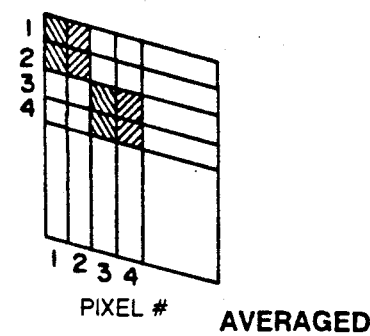

In accordance with the above, a better appreciation of what is actually being applied to the display can be seen in FIGS. 3A-3C. FIGS. 3A-3C illustrate the pixel output of display 12 when the video input of FIGS. 1A and 1B is supplied to decoder 10. In FIG. 1A in the first field T1, pixel 1 is energized on line 1, pixel 3 is energized on line 3, etc. Because the pixel clock times 2 signal to memory 16 signal from clock 14 causes memory 16 to read out each line stored therein twice before the next line is supplied. In other words, once line 1 (from FIG. 1A) is digitized by decoder 10 and read into memory 16, it will be read out twice as lines 1 and 2 in the first field T1 as shown in FIG. 3A. After all of the odd lines 1, 3, 5, 7, etc. are decoded, supplied to memory 16 and read out twice to the display, the even numbered lines are then sequentially stored in the memory and read out. Therefore, the even line as shown in FIG. 1B at T2 (the second filed) has a pixel that is energized at pixel No. 2 and line 4 is energized at pixel No. 4. These are also read out and stored in the display. However, since line 2 information from FIG. 1B is supplied to the display at the beginning of the field, it will also be recorded in lines 1 and 2 (since the display only looks at the sequence of information being provided and does not know whether this information is the first or second line. Therefore, with the field shown in T1 followed by the field shown in T2, the human eye perceives the averaged field shown in FIG. 3C. If this were black and white and the stimulation of pixels 1 in lines 1 and 2 of FIG. 3A and the non-stimulated pixel 1 in lines 1 and 2 of FIG. 3B are averaged, the output in FIG. 3C for pixel 1 at lines 1 and 2 is a gray between black and white. Therefore, some luminance resolution is lost but this slight loss in resolution aids greatly in overcoming the prior art problem of "dynamic jaggies".

Figure 1C:
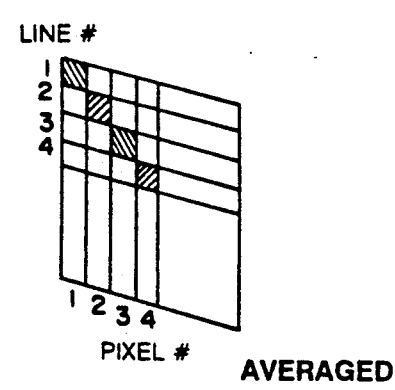
Figure 2A:
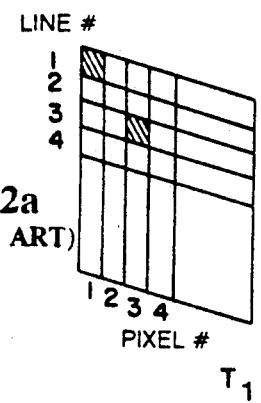
FIGS. 2A-2C illustrate pixel energization with respect to a prior art conversion from interlaced to non-interlaced output.
Figure 2B:
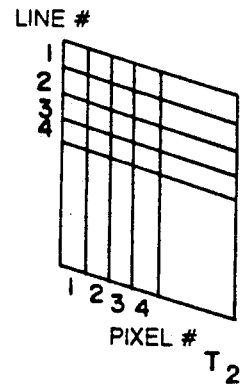
Figure 2C:
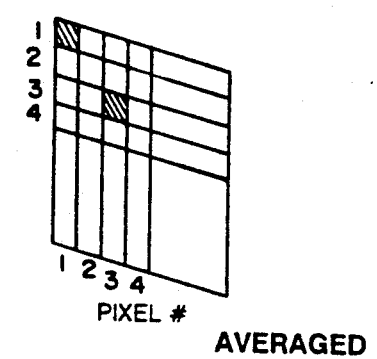

It will be seen that the display which appears on display 12 as shown in FIG. 3C is the line provided by the input video as shown in FIG. 1C with eight colored blocks rather than four although each of these eight blocks is going to be half the luminance of the individual pixels. Each of these eight pixels will be perceived to have half the luminance of the pixels energized at T1 or T2. It will be appreciated that if the diagonal line shown in FIG. 3C is the leading edge of a color change or even a black and white object image change, the luminance on the line will be approximately half the luminance of the remainder of the moving image since the remainder of the image will have the pixels to the left of those shown in T1 and T2 energized all the time. In other words, in the black and white embodiment, those pixels which are energized to be black in T1 and black in T2 as well will be black in the averaged view whereas those which are black in T1 but white in T2 will be gray in the averaged view of FIG. 3C. Accordingly, the annoying "dynamic jaggies" effect is dramatically reduced in the present embodiment by a reduction in contrast at the leading and trailing edges of images having moving objects therein. Since the video image data to display 12 is at twice the pixel clock frequency derived from the input video, the display frequency will be twice as high or 60 Hz where the T1 frame rate of the video input is at 30 Hz. As a consequence, 60 Hz is so much higher in flicker frequency that it cannot be perceived although 30 Hz video input is on the border of human flicker perception. The combination of these two benefits provides a dramatic improvement in video displayed on a sequential input display device even when driven by a conventional raster scan interlaced video input.

A further embodiment of the present invention can provide for a further improvement in leading edge and trailing edge resolution without incurring the "dynamic jaggies" problem of prior art devices. It will be recalled that the reason that the FIG. 3B pixel 2 information is supplied on lines 1 and 2 rather than just line 2 as on the input shown in FIG. 1B, is because the sequential input display device is timed by virtue of the vertical sync signal and is supplied beginning at line 1 even though the data represents line 2 data.

Figure 4A:
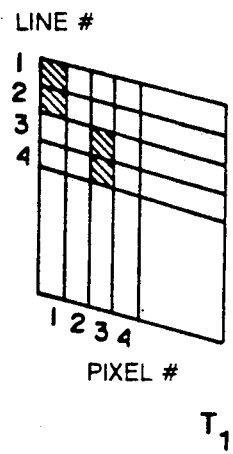
FIGS. 4A-4C illustrate the pixel output of a further embodiment of the present invention.
Figure 4B:
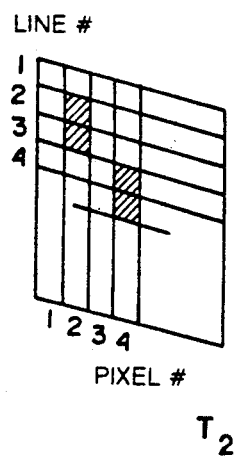
Figure 4C:
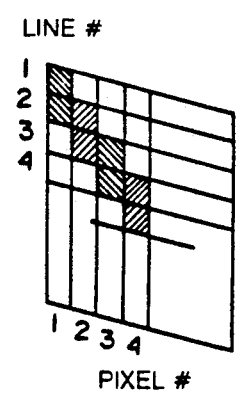
Figure 8:
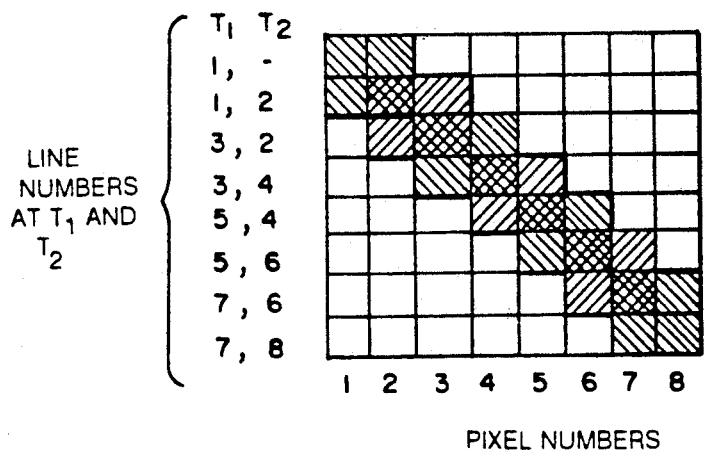
FIG. 8 is an illustration of the pixel output of a preferred embodiment of the present invention with respect to the video input shown in FIGS. 5A-5C.

Improved resolution can be provided by the sequential input display device 12 if the second field (T2) image data is delayed one line with respect to the T1 image data. This is illustrated in FIG. 8 wherein the one line image data delay 20 is shown in phantom lines. This one line image delay serves to delay image data on even lines by one line so that instead of the T2 image for pixel 2 starting at line 1 and then being repeated at line 2 (as shown in FIG. 3B), the energized pixel begins at line 2 and is repeated at line 3 (as shown in FIG. 4B). Since this only happens to the second field, the averaged field will be the stair step pattern shown in FIG. 4C which will have better leading edge resolution than that shown in FIG. 3C while retaining the decreased contrast luminance and the higher display frequency which serve to avoid the problem of prior art "dynamic jaggies".

Figure 5A:
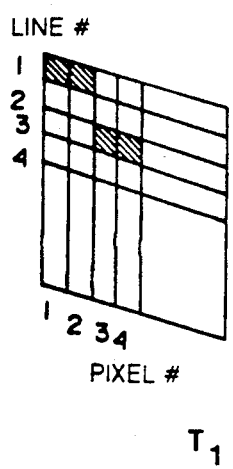
FIGS. 5A-5C illustrate a further video input from a television interlaced raster scan.
Figure 5B:
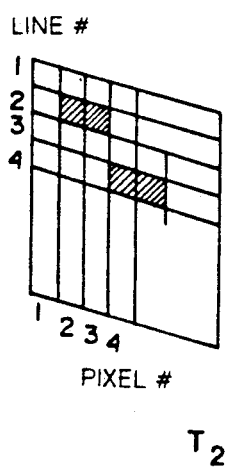
Figure 5C:
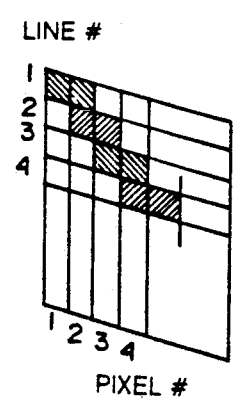

FIGS. 5A-5C are labelled prior art and illustrate a two pixel wide diagonal line whereas FIGS. 1A-1C was a single pixel wide diagonal line, both typical of interlaced raster scan video inputs.

Figure 6A:
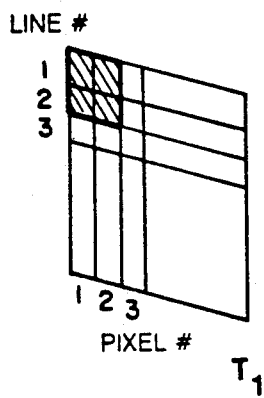
FIGS. 6A-6C illustrate the manner in which the video of FIGS. 5A-5C would be displayed in accordance with one embodiment of the present invention.
Figure 6B:
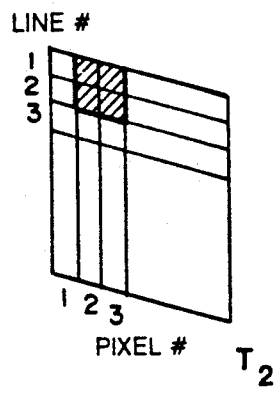
Figure 6C:
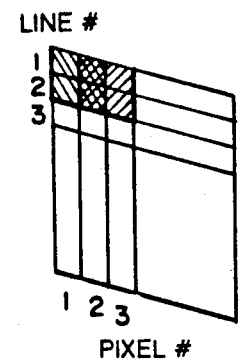

FIGS. 6A-6C illustrate the operation of the FIG. 9 embodiment with the video input illustrated in FIGS. 5A-5C. Again, it can be seen that in field T1, the energization of pixels 1 and 2 on line 1 is repeated on line 2. At T2, the energization of pixels 2 and 3 on line 2 is read out of memory 16 in the line 1 position and then repeated at the line 2 position. Accordingly, the averaged view for pixels 1 and 3 will be a gray scale approximately halfway between the black pixel 1 at lines 1 and 2 in frame T1 and the white of those same pixels at frame T2. However, pixel 2 in lines 1 and 2 are energized in both T1 and T2 and thus, they will be black in the averaged of the two fields or the final frame illustrated in FIG. 6C.

Figure 7:
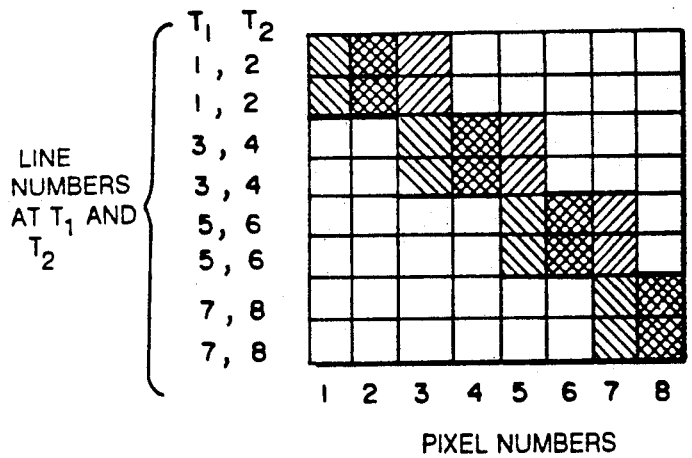
FIG. 7 is a condensed representation of the pixel output illustrated in FIGS. 6A-6C.

FIG. 7 illustrates the operation of the sequential input display device with respect to the first eight lines and the first eight pixels instead of the 3×3 display shown in FIGS. 6A-6C. Cross hatching has been used going to the upper left to the lower right to illustrate energization during the first field, i.e., T1 and extending from the upper right to the lower left to illustrate energization during the second field. Obviously, where a pixel is cross hatched in both fashions, that pixel remains energized for both fields and thus, the average of the two fields will be that same full energization level. With respect to color video, obviously if the pixel or group of three sub-pixels (in the case of true color) is illuminated at a particular luminance level for both fields, the average will have that luminance level.

Accordingly, it can be seen that the rightmost blocks in lines 1 and 2 will have half the luminance of the immediately adjacent lefthand block. Thus, as noted above, the leading and trailing edge "dynamic jaggies" problem of the prior art is overcome. FIG. 7 is, of course, without the staggering of the image data to the display 12. FIG. 8 illustrates the effect of staggering on the video input image shown in FIGS. 5A-5C. As shown in FIG. 5A, pixels 1 and 2 are read at line 1 and are repeated at line 2 to form a four pixel block cross hatched from the upper left to the lower right corner. FIG. 7 without staggering shows the next block representing pixels 2 and 3 at line 2 in FIG. 5B read into the unstaggered display lines 1 and 2.

However, FIG. 8 illustrates this next block as being staggered, i.e., the image is delayed one line so that when the image data arrives at display 12, the top line has already been read in. Accordingly, the image data forms a block covering lines 2 and 3 and pixels 2 and 3 in those lines. Sequentially the same formation is repeated to form the diagonal line as illustrated. It will be noted that the leading edge of this line is an even staircase of pixels with precisely the resolution that the leading edge of the staircase shown in the FIG. 5 input video has. However, as in FIG. 7, the rightmost block of each one of the "steps" in the staircase is half the normal luminance whereas the block to its immediate left is the full luminance. Consequently, the staggered display in FIG. 8 has all the benefits with respect to eliminating the detrimental effects of "dynamic jaggies" for video motion but provides increased image resolution over the unstaggered embodiment shown in FIG. 7.

Figure 10:
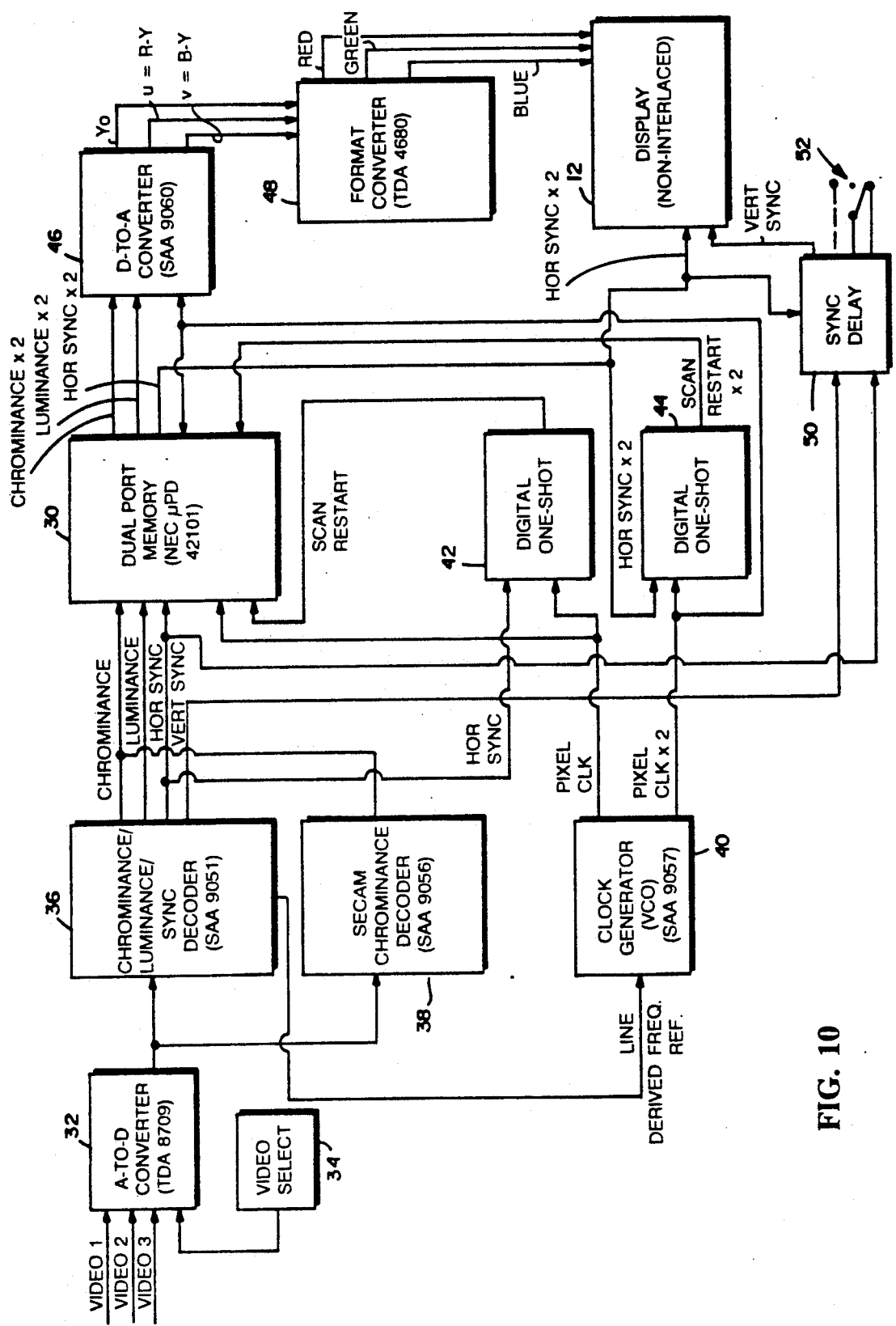
FIG. 10 is a more detailed block diagram of a preferred embodiment of the present invention.

FIG. 10 is a more detailed block diagram of a preferred embodiment of the above invention without the image data one line delay 20 illustrated in FIG. 9. It will be seen that the same effect is had herein by a sync signal delay 50 which is applied to the first field supplied to the display as will be discussed in more detail later.

In addition to the blocks shown, applicant includes chip set product designations for various items in the drawings. These designations identify specific products available from Signetics (Phillips Semiconductor). The one exception is the dual port memory 30 which is a HPD42101 available from NEC Electronics Inc.

FIG. 10 illustrates a plurality of videos, in this instance 3, which could be completely different video formats. These are supplied to A-to-D converter 32 which in turn is controlled by video select 34. Video select 34 can be manually or electronically controlled to identify the input video logic such that the A-to-D converter provides the appropriate format conversion (dependent upon whether the input is MTSC, PAL or SECAM). The output of the A-to-D converter in a preferred embodiment is supplied to both chrominance luminance/sync decoder 36 and SECAM chrominance decoder 38. Should chrominance levels be supplied in SECAM format, the SECAM decoder will provide digitized chrominance output. The outputs of decoders 36 and 38 are supplied to the dual port memory 30. Items 32, 34, 36 and 38 can be considered analogous to the generalized decoder 10 illustrated in FIG. 9.

The line derived frequency reference from decoder 36 is supplied to a voltage controlled oscillator comprising clock generator 40. The clock generator supplies a pixel clock signal to a digital one shot 42 and to the dual port memory 30. It supplies a pixel clock times 2 signal to digital one shot 44. Digital one shot 42 is also responsive to the horizontal sync output from decoder 36 and provides a properly shaped scan restart output to dual port memory 30. The digital one shot 44 in addition to being responsive to the pixel clock times 2 input from clock generator 40 is also responsive to a horizontal sync times 2 output from the dual port memory 30. The result of these two inputs is that the digital one shot 44 provides a scan restart times 2 output to the dual port memory 30. Clock generator 40, digital one shot 42 and digital one shot 44 in FIG. 10 are analogous to the more generic clock 14 shown in FIG. 9.

The dual port memory 30 operates in the same fashion as memory 16 and data is clocked in and out as previously discussed. The chrominance times 2 and luminance outputs are supplied to D-to-A converter 46 which is synchronized with the pixel clock X2 input from clock generator 40. D-to-A converter 46 supplies chrominance levels Y, U and V which are processed in format converter 48. After processing and adjustment, format converter 48 provides the necessary RGB signals to the sequential input display device 12. D-to-A converter 46 and format converter 48 can be thought of as analogous to converter 18 in FIG. 9.

Sequential input display device 12 represents a wide variety of sequential input display devices which all have minor variations in input signal and synchronization signal timing requirements. While the FIG. 10 device could also utilize the image data delay technique illustrated in the variation in the dotted line embodiment of FIG. 9, this FIG. instead illustrates a different manner of delay. Because most dual port memories result in a one line delay, the use of sync delay 50 would be used to delay the vertical sync signal for the first field (T1) by one line but would not delay the second field (T2). The result would still be the unstaggered operation as shown in FIGS. 3A-3C and FIG. 7 or if the sync delay were energized to provide different delays to the first and second lines of the staggered embodiment illustrated in FIGS. 5A-5C and FIG. 8. A manual or electrically operated switch 52 is illustrated to permit operator control so as to be able to select or "force" the image output into the preferred "staggered" display format.

In view of the above, a number of variations and modifications of the present invention will be appreciated by those of ordinary skill in the art to which this invention pertains. For example, numerous circuits and variations in circuits could be applied to provide the staggered or non-staggered display of image data read out from the dual port memory. The specific embodiments of one shots, clock generators, A-to-D and D-to-A converters and other items are well known to those of ordinary skill in the art. While the diagrams in FIG. 1A through FIG. 8 are shown with respect to black and white and gray scale embodiments, these are shown for illustrative purposes only and the invention is clearly applicable to the display of color video input by suitable color sequential input display devices. FIGS. 9 and 10 with respect to block diagrams of the apparatus itself are directed to color display embodiments of the present invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An apparatus for converting at least one interlaced video input to an output for use in a non interlaced input display device, said apparatus comprising:

decoder means, responsive to said video input, for providing a vertical synchronization signal output to said display device, and for providing digitized luminance and chrominance signal outputs, a horizontal synchronization signal output, and as line derived frequency reference;

clock means, responsive to said line derived frequency reference, to said horizontal synchronization signal output from said decoder means, and to a twice horizontal synchronization signal output, for providing a pixel clock output, a twice pixel clock output, a scan restart output and a twice scan restart output;

dual port memory means, responsive to said pixel clock output and said scan restart output, for temporarily storing a line of data including said digitized luminance, chrominance, and horizontal synchronization signal outputs from said decoder means, where said storing is synchronized with said scan restart output, and for twice reading out as an output said stored digitized luminance, chrominance and horizontal synchronization signal outputs where said reading out is synchronized with said twice scan restart output, said twice horizontal synchronization signal output supplied to said display device and fedback to said clock means; and converter means, responsive to said twice pixel clock output and said twice luminance and chrominance output signals, for providing red, green, blue video output to said display device input.

2. An apparatus for converting an interlaced video input in accordance with claim 1, wherein said decoder means comprises:

input converter means for converting said video input to digitized video output; and decoder means, responsive to said digitized video output, for providing a vertical synchronization signal output to said display device, and for providing digitized luminance and chrominance signal outputs, a horizontal synchronization signal output, and a line derived frequency reference.

3. An apparatus for converting an interlaced video input in accordance with claim 1, wherein said clock means comprises:

clock means, responsive to said line derived frequency reference, for providing a pixel clock output and a twice pixel clock output;

a horizontal synchronization signal means, responsive to said horizontal synchronization signal output from said decoder means and responsive to said pixel clock output, for conditioning said horizontal synchronization signal and for providing a scan restart signal output to said dual port memory means; and a twice horizontal synchronization signal means, responsive to a twice read horizontal synchronization signal output and responsive to said twice pixel clock output, for conditioning said twice horizontal synchronization signal and for providing a twice scan restart signal output to said dual port memory means.

4. An apparatus for converting an interlaced video input in accordance with claim 1, wherein said converter means comprises:

a D-to-A converter means, responsive to said twice read digitized chrominance and luminance signal outputs and to said twice pixel clock output, for providing analog chrominance level outputs; and format converter means, responsive to said analog chrominance level outputs, for providing red, blue, green video output to said display device input.

5. An apparatus for converting an interlaced video input in accordance with claim 1, said video input having first and second interlaced fields, further including sync delay means, responsive to said vertical and horizontal synchronization signal outputs from said decoder means and said twice horizontal synchronization signal output from said dual port memory means, for delaying by at least one line said vertical synchronization signal from said decoder means for said first interlaced field and for supplying said delayed vertical synchronization signal to said display device.

6. An apparatus for converting an interlaced video input in accordance with claim 1, further including image delay means, responsive to said converter means, for delaying by at least one line said red, green, blue video output from said converter means.

7. An apparatus for converting at least one interlaced video input to an output for use in a non interlaced input display device, said apparatus comprising:

input converter means for converting said video input to digitized video output;

decoder means, responsive to said digitized video output, for providing a vertical synchronization signal output to said display device, and for providing digitized luminance and chrominance signal outputs, a horizontal synchronization signal output, and a line derived frequency reference.

clock means, responsive to said line derived frequency reference, for providing a pixel clock output and a twice pixel clock output;

a horizontal synchronization signal means, responsive to said horizontal synchronization signal output from said decoder means and responsive to said pixel clock output, for conditioning said horizontal synchronization signal and for providing a scan restart signal output;

a twice horizontal synchronization signal means, responsive to a twice read horizontal synchronization signal output and responsive to said twice pixel clock output, for conditioning said twice horizontal synchronization signal and for providing a twice scan restart signal output;

dual port memory means, responsive to said pixel clock output, for temporarily storing a line of data including said digitized luminance, chrominance, horizontal synchronization signal outputs from said decoder means, where said storing is synchronized with said scan restart output, and for twice reading out as an output said stored digitized luminance, chrominance and horizontal synchronization signal outputs where said reading out is synchronized with said twice scan restart signal output, said twice read horizontal synchronization signal output supplied to said display device and said twice horizontal synchronization signal means; and output converter means, responsive to said twice pixel clock output and said twice read luminance and chrominance output signals, for providing red, green, blue video output to said display device input.

8. An apparatus for converting an interlaced video input in accordance with claim 7, wherein said input converter means comprises an A-to-D converter.

9. An apparatus for converting an interlaced video input in accordance with claim 8, wherein a plurality of video inputs are supplied to said input converter means, said input converter means further includes video select means for selecting one of said plurality of video inputs.

10. An apparatus for converting an interlaced video input in accordance with claim 7, wherein said interlaced video is in one of SECAM, PAL, and NTSC video formats and said decoder means comprises:

a chrominance/luminance/sync decoder means for providing luminance signal, vertical and horizontal synchronization signals and line derived frequency outputs for said input video and chrominance signal outputs for said input video comprising one of PAL and NTSC video formats; and a SECAM chrominance decoder for providing a chrominance signal output for said input video comprised of a SECAM video format.

11. An apparatus for converting an interlaced video input in accordance with claim 7, wherein said clock means comprises a voltage controlled oscillator, responsive to said line derived frequency reference, for providing pixel clock and twice pixel clock outputs.

12. An apparatus for converting an interlaced video input in accordance with claim 7, wherein said horizontal synchronization means and said twice horizontal synchronization means comprise first and second digital one-shot multivibrator means for providing scan restart and twice scan restart signal outputs, respectively.

13. An apparatus for converting an interlaced video input in accordance with claim 7, wherein said output converter means comprises:
   a D-to-A converter means, responsive to said twice read digitized chrominance and luminance signal outputs and to said twice pixel clock output, for providing analog chrominance level outputs; and
   format converter means, responsive to said analog chrominance level outputs, for providing red, blue, green video output to said display device input.

14. An apparatus for converting an interlaced video input in accordance with claim 7, said video input having first and second interlaced fields, further including sync delay means, responsive to said vertical and horizontal synchronization signal outputs from said decoder means and said twice horizontal synchronization signal output from said dual port memory means, for delaying by at least one line said vertical synchronization signal from said decoder means for said first interlaced field and for supplying said delayed vertical synchronization signal to said display device.

15. An apparatus for converting an interlaced video input in accordance with claim 7, further including image delay means, responsive to said output converter means, for delaying by at least one line said red, green, blue video output from said output converter means.

16. An apparatus for converting an interlaced video input to an output for use in a non interlaced input display device, wherein said interlaced video is in one of SECAM, PAL, and NTSC video formats, said apparatus comprising:
   input converter means for converting said video input to digitized video output, wherein said input converter means comprises an A-to-D converter;
   decoder means, responsive to said digitized video output, for providing a vertical synchronization signal output to said display device, and for providing digitized luminance and chrominance signal outputs, a horizontal synchronization signal output, and a line derived frequency reference, said decoder means comprises:
      a chrominance/luminance/sync decoder means for providing luminance signal, vertical and horizontal synchronization signals and line derived frequency outputs for said input video and chrominance signal outputs for said input video comprising one of PAL and NTSC video formats; and
      a SECAM chrominance decoder for providing a chrominance signal output for said input video comprised of a SECAM video format;
   clock means, responsive to said line derived frequency reference, for providing a pixel clock output and a twice pixel clock output, wherein said clock means comprises a voltage controlled oscillator, responsive to said line derived frequency reference, for providing pixel clock and twice pixel clock outputs;
   a horizontal synchronization signal means, responsive to said horizontal synchronization signal output from said encoder means and responsive to said pixel clock output, for conditioning said horizontal synchronization signal and for providing a scan restart signal output, said horizontal synchronization signal means comprises a digital one-shot multivibrator;
   a twice horizontal synchronization signal means, responsive to a twice read horizontal synchronization signal output and responsive to said twice pixel clock output, for conditioning said twice horizontal synchronization signal and for providing a twice scan restart signal output, said twice horizontal synchronization signal means comprises a digital one-shot multivibrator;
   dual port memory means, responsive to said pixel clock output, for temporarily storing a line of data including said digitized luminance, chrominance, horizontal synchronization signal outputs from said decoder means, where said storing is synchronized with said scan restart signal output, and for twice reading out as an output said stored digitized luminance, chrominance and horizontal synchronization signal outputs where said reading out is synchronized with said twice scan restart signal output, said twice read horizontal synchronization signal output supplied to said display device and said twice horizontal synchronization signal means; and
   output converter means, responsive to said twice pixel clock output and said twice read luminance and chrominance output signals, for providing red, green, blue video output to said display device input, wherein said output converter means comprises:
      a D-to-A converter means, responsive to said twice read digitized chrominance and luminance signal outputs and to said twice pixel clock output, for providing analog chrominance level outputs; and
      format converter means, responsive to said analog chrominance level outputs, for providing red, blue, green video output to said display device input.

17. An apparatus for converting an interlaced video input in accordance with claim 16, wherein a plurality of video inputs are supplied to said input converter means, said input converter means further includes video select means for selecting one of said plurality of video inputs.

18. An apparatus for converting an interlaced video input in accordance with claim 16, said video input having first and second interlaced fields, further including sync delay means, responsive to said vertical and horizontal synchronization signal outputs from said decoder means and said twice horizontal synchronization signal output from said dual port memory means, for delaying by at least one line said vertical synchronization signal from said decoder means for said first interlaced field and for supplying said delayed vertical synchronization signal to said display device.

19. An apparatus for converting an interlaced video input in accordance with claim 16, further including image delay means, responsive to said converter means, for delaying by at least one line said red, green, blue video output from said output converter means.

20. A method for converting at least one interlaced video input to an output for use in a non interlaced input display device, said method comprising the steps of:
   (1) providing, in response to said video input, a vertical synchronization signal output to said display device, and digitized luminance and chrominance signal outputs, a horizontal synchronization signal output, and a line derived frequency reference;

(2) providing, in response to said line derived frequency reference, said horizontal synchronization signal output, and a twice horizontal synchronization signal output, (a) a pixel clock output, (b) a twice pixel clock output, (c) a scan restart output and (d) a twice scan restart output;

(3) storing, in response to said pixel clock output and said scan restart output, a line of data including said digitized luminance, chrominance outputs and said horizontal synchronization signal output, where said storing step is synchronized with said scan restart output;

(4) reading out twice said line of data stored as digitized luminance, and chrominance output signals, providing a twice horizontal synchronization signal output, where said reading out is synchronized with said twice scan restart output, and said twice horizontal synchronization signal output is supplied to said display device; and (5) providing, in response to said twice pixel clock output and said stored digitized luminance and chrominance output signals, red, green, blue video output to siad display device input.

21. A method for converting at least one interlaced video input in accordance with claim 20, wherein said step of providing a vertical and horizontal synchronization signal outputs and digitized luminance and chrominance signal outputs and a line derived frequency reference, comprises the steps of:

(1) converting said video input to digitized video output;

(2) decoding said digitized video output, providing a vertical synchronization signal output to said display device, and providing digitized luminance and chrominance signal outputs, a horizontal synchronization signal output, and a line derived frequency reference.

22. A method for converting at least one interlaced video input in accordance with claim 20, wherein said step of providing (a) a pixel clock output, (b) a twice pixel clock output, (c) a scan restart output and (d) a twice scan restart output includes the steps of:

providing, in response to said line derived frequency reference, a pixel clock output, and a twice pixel clock output;

conditioning said horizontal synchronization signal output, in response to said horizontal synchronization signal output and said pixel clock output, and providing a scan restart signal output; and conditioning said twice horizontal synchronization signal output, in response to said twice horizontal synchronization signal output and said twice pixel clock output, and providing a twice scan restart signal output.

23. A method for converting at least one interlaced video input in accordance with claim 20, wherein said providing red, green, blue video output step comprises the steps of:

converting said stored digitized chrominance and luminance signal outputs, in response to said twice pixel clock output, to analog chrominance level outputs; and converting said analog chrominance level outputs to a red, blue, green video output; and providing said red, blue, green video output to said display device.

24. A method for converting at least one interlaced video input to an output for use in a non interlaced input display device, said method comprising the steps of:

(1) converting said video input to digitized video output;

(2) decoding said digitized video output, providing a vertical synchronization signal output to said display device, and providing digitized luminance and chrominance signal outputs, a horizontal synchronization signal output, and a line derived frequency reference.

(3) providing, in response to said line derived frequency reference, a pixel clock output and a twice pixel clock output;

(4) conditioning said horizontal synchronization signal output, in response to said horizontal synchronization signal output and said pixel clock output, and providing a scan restart signal output;

(5) conditioning said twice horizontal synchronization signal output, in response to said twice horizontal synchronization signal output and said twice pixel clock output, and providing a twice scan restart signal output;

(6) temporarily storing, in response to said pixel clock output, a line of data including said digitized luminance, chrominance, horizontal synchronization signal outputs, where said temporary storing step is synchronized with said scan restart signal output;

(7) reading out twice said line of data stored as digitized luminance and chrominance output signals, providing a horizontal synchronization signal output, where said reading out is synchronized with said twice scan restart signal output, said twice horizontal synchronization signal output supplied to said display device; and (8) providing, in response to said twice pixel clock output and said stored digitized luminance and chrominance output signals, red, green, blue video output to said display device input.

25. A method for converting at least one interlaced video input in accordance with claim 24, wherein a plurality of video inputs are supplied and said converting step includes the step of selecting one of said plurality of video inputs.

26. A method for converting at least one interlaced video input in accordance with claim 24, wherein said interlaced video is in one of SECAM, PAL, and NTSC video formats and said decoding step comprises the step of providing digitized luminance and chrominance signals, vertical and horizontal synchronization signals and line derived frequency outputs for said input video comprising one of SECAM, PAL and NTSC video formats.

27. A method for converting at least one interlaced video input in accordance with claim 24, wherein said providing red, green, blue video output step comprises the steps of:

converting said stored digitized chrominance and luminance signal outputs, in response to said twice pixel clock output, to analog chrominance level outputs; and converting said analog chrominance level outputs to a red, blue, green video output; and providing said red, blue, green video output to said display device.

28. A method for converting at least one interlaced video input in accordance with claim 24, wherein said video input having first and second interlaced fields, further including after said reading out step and in response to said vertical and horizontal synchronization signal outputs and said twice horizontal synchronization signal output, the steps of:

delaying by at least one line said vertical synchronization signal for said first interlaced field; and for supplying said delayed vertical synchronization signal to said display device.

29. A method for converting at least one interlaced video input in accordance with claim 24, wherein in response to said stored digitized luminance and chrominance output signals, said providing red, green, blue video output step includes the step of delaying by at least one line said red, green, blue video output to said display device.

* * * * *